United States Patent
Pujante Cuadrupani (10) Patent No.: US 8,930,706 B2
(45) Date of Patent: Jan. 6, 2015

(54) METHOD, DEVICE AND NETWORK FOR AUTHENTICATING THE POSITION OF A NAVIGATION RECEIVER

(76) Inventor: Antonio Pujante Cuadrupani, Murcia (ES)

(\*) Notice: Subject to any disclaimer, the term of this patent is extended or adjusted under 35 U.S.C. 154(b) by 0 days.

(21) Appl. No.: 13/806,923

(22) PCT Filed: Jun. 30, 2011

(86) PCT No.: PCT/EP2011/003435
§ 371 (c)(1),
(2), (4) Date: Dec. 26, 2012

(87) PCT Pub. No.: WO2012/003998
PCT Pub. Date: Jan. 12, 2012

(65) Prior Publication Data
US 2013/0106655 A1    May 2, 2013

(30) Foreign Application Priority Data
Jun. 30, 2010  (FR) ...................................... 10 02750
Dec. 31, 2010  (BE) ........................................ 020671

(51) Int. Cl.
*H04L 29/06* (2006.01)
*G06F 21/00* (2013.01)
*G01S 19/33* (2010.01)
*G01S 19/03* (2010.01)
*G01S 19/21* (2010.01)

(52) U.S. Cl.
CPC ................. *G01S 19/33* (2013.01); *G01S 19/03* (2013.01); *G01S 19/215* (2013.01)
USPC .......................................................... 713/176

(58) Field of Classification Search
CPC ... H04L 9/3247; H04L 9/3294; H04L 9/3281; H04L 63/08; G01S 19/03; G01S 19/215
See application file for complete search history.

(56) References Cited

U.S. PATENT DOCUMENTS

| | | | |
|---|---|---|---|
| 5,754,657 A | 5/1998 | Schipper et al. | |
| 2010/0134352 A1 | 6/2010 | Thomson et al. | |

FOREIGN PATENT DOCUMENTS

WO    2009001294 A2    12/2009

*Primary Examiner* — Izunna Okeke
(74) *Attorney, Agent, or Firm* — Ladas & Parry LLP (57) ABSTRACT

This document describes a method of processing data which consists in detecting and storing in a device the stream of navigation messages and the physical parameters of the signals received in a receiver originating from the satellite-based or terrestrial navigation systems and its comparison with the original data transmitted by the navigation system with respect to a time reference common for all the signals. The stream recorded generates a signature which is unique for each instant and each position over the whole service area (Earth or other planet or celestial body). The result of the processing of the data for a particular point of the Earth serves to validate and authenticate the position and the time reference that are delivered by the navigation receiver as well as the quality and authenticity of the signal received.

12 Claims, 3 Drawing Sheets

METHOD, DEVICE AND NETWORK FOR AUTHENTICATING THE POSITION OF A NAVIGATION RECEIVER

CROSS REFERENCE TO RELATED APPLICATION

This is a National Stage of International Application No. PCT/EP2011/003435, filed 30 Jun. 2011, which claims the benefit of Application No. 10 02750, filed in France on 30 Jun. 2010 and Application No. 020671, filed in Belgium on 31 Dec. 2010, the disclosures of which Applications are incorporated by reference herein.

This document describes a method for data processing that consist in detecting and storing in a device the data flow from satellite navigation systems and its comparison with the original data transmitted by the satellite navigation system with respect to a time reference that is unique and common for all signals. This allows to generate a signature that is unique to every moment and every position throughout the service area (Earth or another planet or celestial body). The result of processing these signals in a particular point in the service area permits to validate the position of the receiver and/or the time reference supplied by the receiver from the navigation signals and which can be used for the synchronization of networks (telecommunications, energy transport, water transport, etc.). The result of the processing of these signals is also used to authenticate the received signal and verifying its quality (signal non-blurred or distorted). The information thus obtained can be forwarded to a reference station for validation or stored on-site for treatment afterwards.

The method aims to solve the problem of authenticating the position of a receiver and the protection of the synchronization of logistic networks. This method prevents and deters users from sending manipulated, altered or false information. This method also protects the reference time stations against interference or fake signals that can jam the reference delivered. The method can also detect interference situations or signal spoofing.

The method proposed in this description is based on the navigation messages and the observation of some physical parameters that can be observed in the received signals. The navigation messages are transported and multiplexed with the navigation pseudo codes. This data stream contains information to help navigation such as ephemeris, specific parameters of each satellite, etc., sent by each satellite constellation at each instant of time. This data stream can be generated and transmitted from a ground station or directly generated by the satellite. This data stream contains information that is common to all satellites of the navigation system and information that are unique for each satellite of the navigation system FIG. 1 shows signals arriving at receiver point from different transmitters creating a signature.

Figure 1:
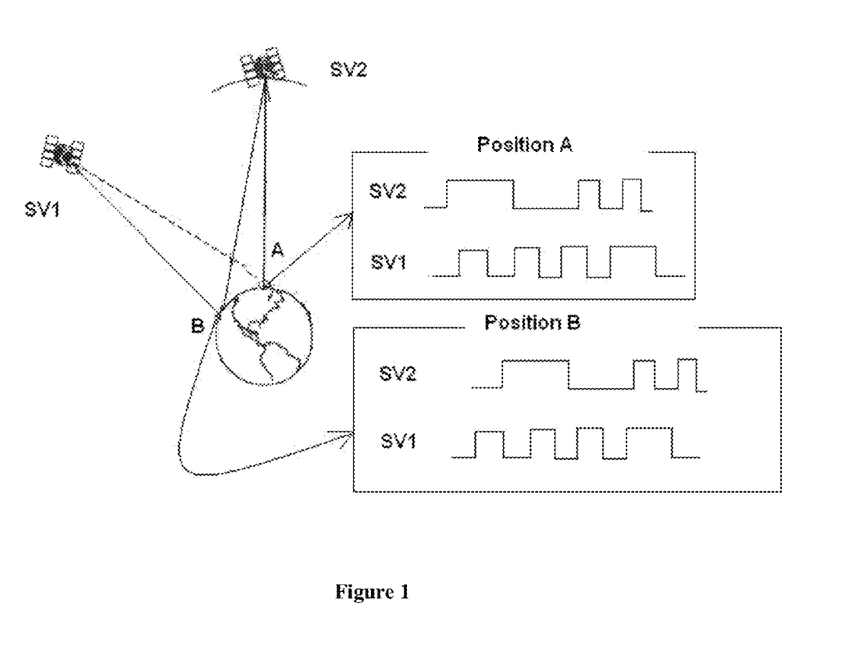

The concept is described in FIG. 1.

The method consists of simultaneously receiving on a terminal the navigation message of (at least) two (or more) satellites that belong to one or more constellations: GPS, Galileo, GLONASS, etc. This method can also be performed with signals of navigation systems from terrestrial stations, such as Decca, Omega, Loran-C, etc. This method can also be carried out with communications signals from terrestrial systems such as satellite television broadcast/digital audio (DVB-S, S-DAB, DARS, DMB, etc.) or with communications signals from terrestrial systems such as terrestrial television broadcast/digital audio (DVB-T, DAB-T, DARS, DMB, etc.).

Figure 2:
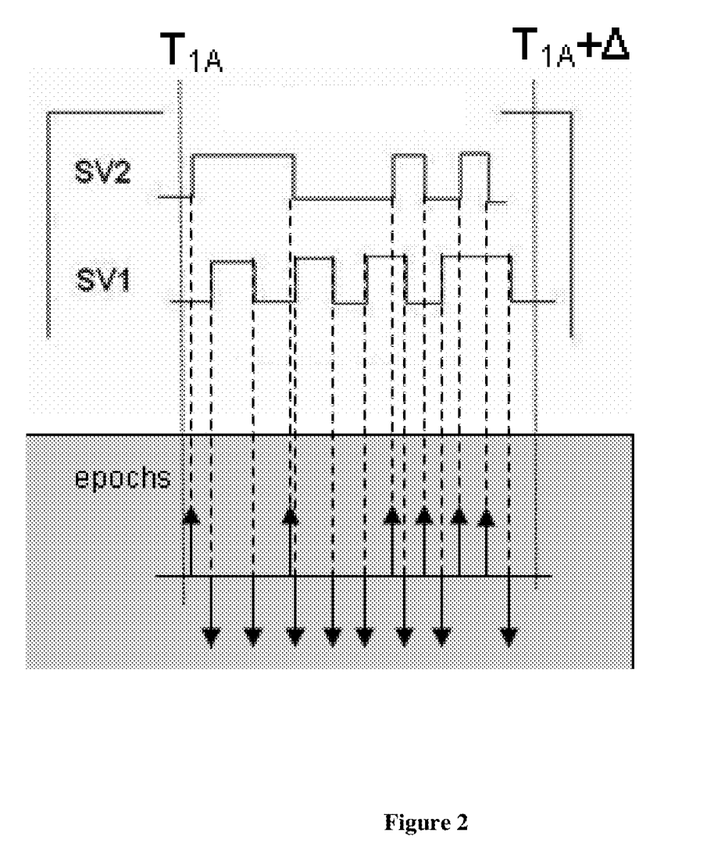
FIG. 2 shows an example of a signature created by the different signals arriving at the receiver point.

The data flow from the satellites is stored with a unique time reference that creates a signature (set of epochs) that is unique for each time and position on the surface of the Earth, as shown in FIG. 2. The position and the signature are stored at every instant with a time resolution sufficient to establish the authentication of the position. This resolution will be a function of the speed of movement of the receiver and the authentication requirements of the system. The resolution will be configurable for each user of the system.

The navigation messages are generated by the operator of the satellite system and sent to each satellite from earth stations (or alternatively generated on board) or generated in stations in the case of terrestrial systems. These messages are stored in a centralized data processing center that will store all signals that carry navigation messages and their transitions with a single time reference.

A system for search and selection of data will make possible comparisons between data reported as received by a receiver with navigation data sent to each instant of time by the operator of the satellite navigation system.

The authentication data stored in the receiver will be a space-time correlation of data actually sent by the operator of the satellite system and the data stored in the receiver for the signals that carry the navigation messages and the position of the receiver extracted from the pseudo code of the navigation system.

The data to be used are:
- the position recorded by the receiver for a given instant Tref,
- the navigation messages sent by the operator of the navigation satellite system in the area where was the receiver and that have arrived to the position reported by the receiver at the a given instant Tref.
- the navigation messages recorded by the receiver in the area where was the receiver and that have arrived to the position reported by the receiver at a given instant Tref.

As described in FIG. 2, the authentication signature is provided by the epochs or instants of transition of the signals that carry each navigation message. This signature is used by the system in charge of authenticating the position to validate the information recorded by the receiver of the user. The time resolution must be sufficient to obtain the authentication of location. The sampling of the signal that contains the navigation messages must be sufficient for the application of the method and the detection of the epochs or instants of transition in the signals.

Figure 3:
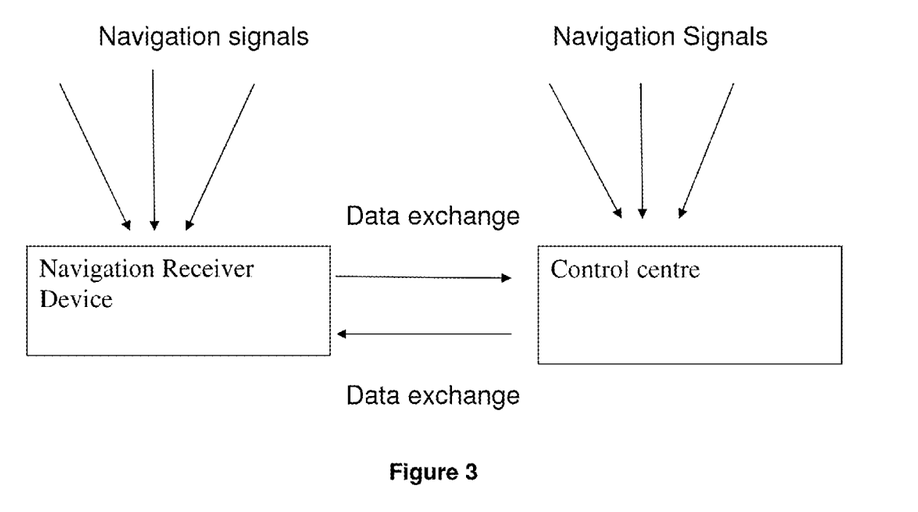
FIG. 3 shows information flow between the receiver and the control center to authenticate the signature.

The signature is based on the instants of the transitional epochs or instants of transition the signals that carry the navigation messages. This provides a spatial resolution of the authentication system of the order of a few meters, which allows you to use authentication for fleets of all types: cars, trucks, boats, planes, etc. The signature may be sent to the control center or stored in the receiver (FIG. 3).

The reliability of authentication can be increased by sending in real time the processed information to an authentication control center. This technique is independent of the navigation satellite system operator and can be managed exclusively by the authentication agent.

The reliability of the authentication increases with the number of signals that are simultaneously recorded in the receiver. As a minimum it is necessary to record the flow of data from two different satellites. There is no maximum number of signals to be processed.

The reliability of the authentication can be increased by varying the selection of the stream of signals to be used in a given period. This selection will be done by the authentication agent. This method is independent of the operator of the navigation system but it is necessary to communicate to the receivers in the service area the selection of signals to be used.

The reliability of the authentication can be increased by varying the information transmitted in the navigation message flow (i.e. random). This method is dependent on the navigation system operator and will be done in cooperation with the authentication agent.

The reliability of the authentication can be increased by variation of the renewal period of the information transmitted in the navigation message stream. This method is dependent on the navigation system operator and will be done in cooperation with the authentication agent.

The reliability of the authentication can be increased by checking the integrity of the signal received through the information sent by SBAS systems (EGNOS, WAAS, MSAS, GAGAN etc.) or by autonomous integrity verification techniques such as RAIM, FDE, etc.

The reliability of the authentication can be increased by using in a cooperative way the information of the signatures and positions of other users equipped with navigation receivers present in the environment and by communication with these users by techniques such as Bluetooth, WIFI, WAVE/DSRC to generate meta-signatures with the information relative to the position of other users by incorporating these signatures to the data to be sent to the control center for validation.

The reliability of the authentication can be increased by checking the quality of the received signals and performing the signal authentication by observing some signal parameters, such as:

Comparison of the signature obtained from the navigation messages data stream received from a satellite at a given instant with the information that is common to all other satellites of the navigation system. If the comparison result shows divergence between the satellite under analysis and the other satellites, a warning will be triggered and will be associated to the generated signature to prevent from using the information from the satellite (or station).

Comparison of the signature obtained from the navigation messages data stream received from a satellite at a given instant with the information that is particular to every other satellite of the navigation system (i.e ephemeris). If the comparison result shows divergence between the satellite under analysis and the other satellites, a warning will be triggered and will be associated to the generated signature to prevent from using the information from the satellite (or station).

Comparison of the Doppler frequency deviation received from each satellite (or navigation signals transmitting station) with the prediction of the Doppler frequency deviation for the navigation receiver calculated in the receiver. This prediction is calculated from the position, velocity and acceleration of the receiver and from the ephemeris of each satellite. The calculation and comparison with the measurement of the Doppler frequency deviation is done in the navigation receiver individually for each satellite for which a signal is received. If the comparison provides a divergent result, a warning will be associated with the generated signature to prevent from using the information from the satellite (or station).

Comparison of the signal level received from each satellite (or navigation signals transmitting station) with the prediction of the expected signal level for each satellite and calculated by using information on the position of the receiver, the spatial orientation of the receiver and the effect of this attitude on the receiving antenna pattern and the distance between the satellite (or station) and the receiver. These data are obtained from the ephemeris of the satellites and the receiver position (latitude, longitude, and height). The calculation of the level of the received signal from each satellite is made in the navigation receiver individually for each satellite for which a signal is received. If the comparison provides a divergent result, a warning will be associated with the generated signature to prevent from using the information from the satellite (or station).

Comparison of the information of the navigation messages for each satellite between two consecutive pages and verification of the updated information of the IODC and IODE between these two consecutive pages. If there are changes in the content of subframes between two consecutive pages and there is no update of the information of the IODC and IODE, a warning will be associated with the generated signature to prevent from using the information from the satellite (or station).

Comparison of the information of the navigation messages for each satellite between two consecutive subframes or pages and verification of the correct progression of the time counter in seconds of the week (i.e. TOW). If the comparison shows an unexpected change, a warning will be associated with the generated signature to prevent from using the information from the satellite (or station).

Comparison of the information of the navigation messages among all satellites in view for the same page or subframe and verification of the correct progression of the time counter in seconds of the week (i.e. TOW). If the comparison shows an unexpected change, a warning will be associated with the generated signature to prevent from using the information from the satellite (or station).

Comparison of the time of arrival of the preamble or synchronization header of each page or subframe for all satellites in sight and verification of the correct time distance between two consecutive preambles. If this comparison shows an unexpected change, a warning will be associated with the generated signature to prevent from using the information from the satellite (or station).

Comparison of a signature calculated from the data received in the control center for a certain position of a receiver and integrated by a predetermined group of satellites (or signal source stations) with the data received directly at the receiver from the satellites to verify the quality of the signals received. The signature calculated in the control center will be sent to the receiving device that will use it as a reference pattern to estimate the quality of the signal received directly from the satellites.

Verification of the parity check of each word of each subframe (e.g. HOW word, TLM word) of all satellites in view with respect to the content of the word. If the verification shows an unexpected change, a warning will be associated with the generated signature to prevent from using the information from the satellite (or station).

The exchanged and stored information can be encrypted (symmetric or asymmetric key) to protect the information against tampering or interference external to the system, including the encryption of information received and processed by the receiving device or generated by the control center.

The signature obtained by the method described can be used to perform the following procedures:
  Generating symmetric keys (such as Diffie-Hellman, AlGamal, etc.) using the signatures synchronized in the receiver device and the control center as a source for generating encryption keys.
  Generating asymmetric keys using the signatures received in the receiver device and the control center, using a one-way secret function with an asymmetric encryption algorithm (for example RSA).
  Key exchange between two (or more) points to be connect in a network.
  Acknowledging the identity of the parties connected by a link between two receivers and/or the control center
  Generating padding bits for the data stream
  Generating digital signatures to validate documents or actions The method described can be used for application in the following fields (non-exhaustive list):
Transport
  Management and security for transport of human beings
  Management and security for the transportation of goods and products, including transportation of dangerous materials/goods.
  Optimization of fleet management
  Monitoring according to ICAO specifications
  Merchant Marine ships and boats/yatchs position monitoring
  Control and payment of road tolls
  Control and payment of vehicles parking
Safety and Security
  Public safety
  Surveillance of persons
  Monitoring vehicles
  Implementation and verification of international agreements
  Protection of country or private land borders
  Monitoring and protection of international aid
  Legal certification of the position at a given time
  Bank Data Protection
  Management and reduction of insurance companies risk
  Tachographs
  Military Applications
Ecology
  Monitoring and control of fishing fleets
  Prevention, surveillance and control of waste
  Monitoring and control of agricultural production
  Verification and control of international agreements
  Transport and storage of contaminants
Science
  Applications in geodesy
  Protection of natural resources
  Applications in biology and protection of the biosphere
Infrastructure
  Certification of the time reference obtained for the synchronization of communications networks, power grids, energy products transport, water transport, etc.
Data Encryption
  Generation of symmetric keys (such as Diffie-Hellman, AlGamal, etc.) using the synchronized signatures in the receiver device and the control center.
  Generating asymmetric keys using signatures received in the receiving device and the control center, such as RSA.
  Key exchange between two (or more) points to be connected in a network.
  Generating the authentication of identity
  Generation of padding bits for the data stream
  Generation of digital signatures to validate documents or actions

REFERENCES

[1] Galileo Open Service, Signal In Space, Interface Control Document, OS SIS ICD, Draft 1
[2] GPS, SIS-ICD

The invention claimed is:
1. A method for data processing performed by a device equipped with a navigation receiver and performed by a control center for the authentication of a signature generated from a signal which contains navigation messages and which is unique for each instant in time and each position across the whole service area, the method comprising the following steps:
  detecting, by the device equipped with a navigation receiver, the navigation messages of at least two satellites, or more, which belong to one or more constellations: Global Positioning System, Galileo, Glonass;
  recording in the device the data streams arriving from the satellites and that are stored with a unique time reference;
  producing a signature that is unique for each instant in time and for each position across the surface of the Earth, wherein an authentication signature is given by a set of time epochs of the transition of the signals which carry each navigation message for each satellite received respect to a common time reference and for a time interval beginning at an instant of reference, wherein an authentication system operator determines this instant as well as the time period of this interval, wherein this information is pre-programmed in the device or communicated to the receiver from the control center, wherein this procedure can be reproduced several times according to the authentication system operator commands;
  wherein in order to generate the said signature, the data used by the receiver is:
  a) a position recorded by the receiver for the reference instant Tref and during the signature time interval, wherein this interval is determined by the authentication system operator;
  b) a set of time epochs given by the transition of the signals which carry the navigation messages for each satellite with respect to a common time reference and for a time interval beginning at a given reference instant as determined by the authentication system operator, these signals being recorded by the receiver at the region where the receiver was located and which have arrived to the receiver declared position for the reference instant Tref;
  c) a unique identifier for the receiver particular for each receiver device so that it can be identified through the authentication process performed by the control center;
  recording the position and the signature at each instant in time with a time resolution that will be high enough to obtain the authentication of the position and the authentication of the time reference generated from the navigation signal received at each instant;
  adaptation of the time resolution as a function of the speed of movement of the receiver and the authentication requirements of the system, wherein it is possible to configure the time resolution for each system user, wherein the time resolution will be pre-programmed in the receiver device or generated by a pre-programmed algorithm in the receiver device or it will be decided by the control center and sent to the receiver;

reception by the authentication control center of the file registered by the receiver device;

retrieval, from the database of the control center, of the navigation messages sent by all visible satellites in the coverage area where the receiver was located at the reference instant Tref;

calculation, for the reference instant Tref, of the navigation messages and their transitions that have actually arrived at each instant to the receiver position from all satellites that are visible from the receiver, wherein this calculation is performed using the satellites' position and the receiver device position;

comparison of the information calculated by the control center with the data declared as received by the receiver device, wherein for this comparison, the data used by the control center is:

a) a position declared by the receiver for the reference instant Tref and during the signature time interval, this interval being determined by the authentication system operator;

b) a set of time epochs given by the transition of the signals which carry the navigation messages for each satellite with respect to a common time reference and for a time interval beginning at a given reference instant as determined by the authentication system operator, wherein the signals have been recorded by the receiver at the region where the receiver was located and which have arrived to the position declared by the receiver for the reference instant Tref and have been sent to the control center;

c) a set of time epochs given by the transition of the signals which carry the navigation messages for each satellite with respect to a common time reference and for a time interval beginning at a given reference instant as determined by the authentication system operator, wherein the navigation messages have been sent by the operator of the navigation satellites operator on the region where the receiver was located and that have arrived to the position declared by the receiver at the time reference instant Tref, wherein the control center calculates the signals received on any point on the surface of the planet for each instant in time, wherein the calculation is performed from the data of the signals recorded by the control center monitoring stations;

d) a unique identifier for the receiver, particular for each receiver device so that it can be identified through the authentication process performed by the control center;

certification, at the control center, of the validity or non-validity of the data provided by the navigation receiver device;

using this certification, the position and time reference provided by the receiver device is authenticated or declared as not authenticated;

data stocked and/or sent towards the control center and/or received from the control center are encrypted by symmetric or asymmetric keys for the protection of the exchanged information;

wherein the signature is generated either from elementary data or from direct measurements on the time epochs given by the transition of the signals performed in the receiver device before being stocked and/or sent towards the control center and/or received from the control center;

wherein to generate the signature from elementary data, the system performs a reconstruction of the arrival instant of each sub-frame from the distance of the receiver to each satellite as well as from the Doppler frequency deviation registered for the signal received for each satellite, wherein the Doppler deviation provides information on the sense of approximation of each satellite to the receiver, orbital continuity of each satellite and the satellite position with respect to the receiver, wherein the reconstruction of this information is based on a process for the refinement of the precision of the position of the receiver with the following steps:

a) generating an estimated signature from the calculation of the receiver distance to each satellite, wherein the distance calculation is performed using the ephemeris received for the orbital prediction of each satellite and from the position obtained from the pseudorandom-codes at a given instant and with a unique time reference that is common to the whole system;

b) generating a recorded signature from the time epochs given by the transition of the signals which carry the navigation messages actually received from each satellite associated to the position obtained by the receiver, wherein position of the receiver is obtained from the pseudorandom-code signals at a given instant and with a unique time reference that is common to the whole system;

c) comparing the estimated signature with the information of the actually recorded signature;

d) iterating the procedure detailed above for the refinement of the position of the receiver by convergence of the estimated signature and the recorded signature, wherein the procedure estimates the resulting signature over a zone which includes the obtained position from the PRN codes and compares them with the recorded signature with respect to a threshold level for the difference between the estimated and the registered signatures, wherein the iterative process is completed and comes to an end when the convergence target is obtained.

2. The method of claim 1 for the authentication of the information performed by the control and data processing center comprising the following steps:

receiving and recording in a database the signal stream of the navigation messages of all satellites generated by the system operator;

identifying the signal stream of the navigation messages received on the surface of the planet for all the satellites and the orbital evolution data, both extracted from the information generated by the navigation system operator with a unique reference common to all the system;

storing the evolution of the signal stream of the navigation messages generated by the system operator for all satellites in a database with a unique time reference and that is common to all the system;

receiving and decoding the received information from each receiver device and user of the service;

calculating the navigation messages and their transitions which have actually arrived at the position of the receiver at any time instant from all satellites that are in line of sight to the receiver, wherein this calculation is based on the position of the receiver and the positions of the satellites for the reference instant Tref;

comparing by means of a space-time correlation of the navigation messages actually sent by the satellite system operator towards the position declared by the receiver and the data stored at the receiver for the set of time epochs given by the transition of the signals, wherein these signals correspond to each navigation message received from each satellite with respect to a common time reference and for the interval message received from each satellite with respect to a common time reference and for the interval beginning at a reference instant determined by the operator of the authentication system, wherein these navigation messages have been sent by the navigation satellite operator system to the geographic location reported by the receiver and have arrived at the position reported by the receiver at the reference instant Tref, wherein the position declared by the receiver is extracted from the pseudo-code of the navigation system;

certification at the control center of the validity or non-validity, of the data provided by the navigation receiver device;

using this certification, the position and time reference provided by the receiver device will be authenticated or declared as non-authenticated.

3. The method of claim 1 for increasing the reliability of the authentication method comprising one or more of the following techniques:

variations in certain portions of the information transmitted in the navigation message stream, namely, in a random way or following an algorithmic law;

variations with a random pattern of the refreshment period of the information transmitted by the navigation message stream;

variations in the number of signals that are simultaneously recorded in the device equipped with the receiver wherein it is necessary to record the data stream from two different satellites, wherein there is no maximum number of signals to be processed;

variations of the selection of the signal streams to be used over a specified period of time to generate the signature that will be used for authentication;

real time transmission of the processed information towards an authentication control center and/or on-site storage for subsequent processing;

verifications of the integrity of the signal received through the information sent by a Satellite-based Augmentation System (SBAS) or by means of receiver autonomous integrity monitoring techniques; and using the information of the signatures and the positions of other users equipped with navigation receivers present in the same area and communication with these users by-means of wireless technologies to generate meta-signatures with the information relative to the position of other users and incorporating the information from these other users' signatures to the data to be sent to the control center for validation.

4. The method of claim 1 for processing data from the signal received at each instant and that carries the navigation messages comprising the following steps:

detecting, by the device equipped with a navigation receiver, of the navigation messages of at least two satellites or more which belong to one or more constellations: Global Positioning System, Galileo, and Glonass;

recording in the device the data streams arriving from the satellites and that are stored with a unique time reference;

producing a signature that is unique for each instant in time and for each position across the surface of the Earth, wherein the authentication signature is given by the set of time epochs of the transition of the signals which carry each navigation message for each satellite received with respect to a common time reference and for a time interval beginning at an instant of reference, wherein the authentication system operator determines this instant as well as the time period of this interval, wherein this information is pre-programmed in the device or communicated to the receiver from the control center, wherein this procedure is reproduced several times according to the authentication system operator commands;

selecting the signal streams of the navigation messages to be used in a specific period of time and which will be recorded in the receiver device; and comparing of the signature of the data stream of the navigation messages received at a given instant with the information that is common to all other satellites of the navigation system; and comparing of the signature of the data stream of the navigation messages received at a given time with the information that is specific to each satellite of the navigation system, wherein these data are obtained from the ephemeris or any other data that are particular to each satellite.

5. The method of claim 1, further comprising retransmission of information from the control center to a station that provides reference time or signal authentication, wherein the transmission contains information obtained from the navigation messages for its validation, the method comprising the following steps:

transmitting the signature obtained from the navigation messages from the control center to a reference station;

validation or non-validation of the navigation messages received by comparison with the signature sent by the control center; wherein this signature is unique for each instant in time and each position over the whole service area.

6. A device for reception and data processing of navigation signals to produce an authentication of a position of said device using received navigation messages produced according to a method for data processing performed by the device equipped with a navigation receiver and performed by a control center for the authentication of a signature generated from a signal which contains navigation messages and which is unique for each instant in time and each position across the whole service area, the method comprising the following steps:

detecting, by the device equipped with a navigation receiver, the navigation messages of at least two satellites or more which belong to one or more constellations: Global Positioning System, Galileo, and Glonass;

recording in the device the data streams arriving from the satellites and that are stored with a unique time reference;

producing a signature that is unique for each instant in time and for each position across the surface of the Earth, wherein an authentication signature is given by a set of time epochs of the transition of the signals which carry each navigation message for each satellite received respect to a common time reference and for a time interval beginning at an instant of reference, wherein an authentication system operator determines this instant as well as the time period of this interval, wherein this information is pre-programmed in the device or communicated to the receiver from the control center, wherein this procedure can be reproduced several times according to the authentication system operator commands;

wherein in order to generate the said signature, the data used by the receiver is:

a) a position recorded by the receiver for the reference instant Tref and during the signature time interval, wherein this interval is determined by the authentication system operator;
b) a set of time epochs given by the transition of the signals which carry the navigation messages for each satellite with respect to a common time reference and for a time interval beginning at a given reference instant as determined by the authentication system operator, these signals being recorded by the receiver at the region where the receiver was located and which have arrived to the receiver declared position for the reference instant Tref;
c) a unique identifier for the receiver particular for each receiver device so that it can be identified through the authentication process performed by the control center;
recording the position and the signature at each instant in time with a time resolution that will be high enough to obtain the authentication of the position and the authentication of the time reference generated from the navigation signal received at each instant;
adaptation of the time resolution as a function of the speed of movement of the receiver and the authentication requirements of the system, wherein it is possible to configure the time resolution for each system user, wherein the time resolution will be pre-programmed in the receiver device or generated by a pre-programmed algorithm in the receiver device or it will be decided by the control center and sent to the receiver;
reception by the authentication control center of the file registered by the receiver device;
retrieval, from the database of the control center, of the navigation messages sent by all visible satellites in the coverage area where the receiver was located at the reference instant Tref;
calculation, for the reference instant Tref, of the navigation messages and their transitions that have actually arrived at each instant to the receiver position from all satellites that are visible from the receiver, wherein this calculation is performed using the satellites position and receiver device position;
comparison of the information calculated by the control center with the data declared as received by the receiver device, wherein for this comparison, the data used by the control center is:
a) a position declared by the receiver for the reference instant Tref and during the signature time interval, this interval being determined by the authentication system operator;
b) a set of time epochs given by the transition of the signals which carry the navigation messages for each satellite with respect to a common time reference and for a time interval beginning at a given reference instant as determined by the authentication system operator, wherein the signals have been recorded by the receiver at the region where the receiver was located and which have arrived to the position declared by the receiver for the reference instant Tref and have been sent to the control center;
c) a set of time epochs given by the transition of the signals which carry the navigation messages for each satellite with respect to a common time reference and for a time interval beginning at a given reference instant as determined by the authentication system operator, wherein the navigation messages have been sent by the operator of the navigation satellites operator on the region where the receiver was located and that have arrived to the position declared by the receiver at the time reference instant Tref, wherein the control center calculates the signals received on any point on the surface of the planet for each instant in time, wherein the calculation is performed from the data of the signals recorded by the control center monitoring stations;
d) a unique identifier for the receiver, particular for each receiver device so that it can be identified through the authentication process performed by the control center;
certification, at the control center, of the validity or non-validity of the data provided by the navigation receiver device;
using this certification, the position and time reference provided by the receiver device is authenticated or declared as not authenticated;
data stocked and/or sent towards the control center and/or received from the control center are encrypted by symmetric or asymmetric keys for the protection of the exchanged information;
wherein the signature is generated either from elementary data or from direct measurements on the time epochs given by the transition of the signals performed in the receiver device before being stocked and/or sent towards the control center and/or received from the control center;
wherein to generate the signature from elementary data, the system performs a reconstruction of the arrival instant of each sub-frame from the distance of the receiver to each satellite as well as from the Doppler frequency deviation registered for the signal received for each satellite, wherein the Doppler deviation provides information on the sense of approximation of each satellite to the receiver, orbital continuity of each satellite and the satellite position with respect to the receiver, wherein the reconstruction of this information is based on a process for the refinement of the precision of the position of the receiver with the following steps:
a) generating an estimated signature from the calculation of the receiver distance to each satellite, wherein the distance calculation is performed using the ephemeris received for the orbital prediction of each satellite and from the position obtained from the pseudorandom-codes at a given instant and with a unique time reference that is common to the whole system;
b) generating a recorded signature from the time epochs given by the transition of the signals which carry the navigation messages actually received from each satellite associated to the position obtained by the receiver, wherein position of the receiver is obtained from the pseudorandom code signals at a given instant and with a unique time reference that is common to the whole systems;
c) comparing the estimated signature with the information of the actually recorded signature;
d) iterating the procedure detailed above for the refinement of the position of the receiver by convergence of the estimated signature and the recorded signature, wherein the procedure estimates the resulting signature over a zone which includes the obtained position from the PRN codes and compares them with the recorded signature with respect to a threshold level for the difference between the estimated and the registered signatures, wherein the iterative process is completed and comes to an end when the convergence target is obtained;
wherein said device comprises:
a unit for the reception and validation of the navigation signals with sampling capabilities such that will allow to apply the method and the detection of the time epochs given by the transition of the signals;

a storage and data management unit with a program for the selection of the signals to be recorded;

a unit for receiving data from the control center and sending data to the control center.

7. The device of claim 6, further comprising a control center for reception of navigation messages and for retrieval of navigation messages data and for management of communication stations that link with users, the control center comprising the following features:

reception, by monitoring stations, of all navigation messages from all visible satellites from each monitoring station;

reception, classification, storage and sorting by the control center of the data streams and the navigation message streams with respect to a reference time instant Tref, and with reference to the satellite or source station and its position;

establishing communication links between the control center and the users for data exchange.

8. The method of claim 1 for reception, at the control center, of the signature of a time reference station used for network synchronization comprising the following steps:

calculation by the control center, using the navigation messages received in the said center, of the signature which must be received at a given instant in time at the position of the time reference station;

real-time transmission from the reference station to the control center of the signature generated from the received signals, or, alternatively, this transmission can be done from the control center towards the reference station, wherein, in the first case, the validation is made in the control center, in the other case, the validation is made in the reference station to reduce response time;

validation or non-validation of the signature generated from the navigation messages received in the reference time station by comparing with the estimated signature computed for the said station by the control center;

if the signature generated by the reference station at a given instant in time does not match the signature calculated at the control center, an alarm will be generated in the control center to reject the information received from the reference time station, or, alternatively, if the information is transmitted from the control center towards the reference station, the alarm will be generated directly at the reference station.

9. The method of claim 1, where the signal sources are selected from the group consisting of:

navigation signals originated at navigation systems with space stations or satellites;

navigation signals from navigation systems with terrestrial stations;

communications signals from systems, including television broadcast or digital audio from satellites;

communications signals originated from terrestrial systems such as terrestrial broadcast television or terrestrial digital audio.

10. The method of claim 4, for quality verification and authentication of the received navigation signal, the method comprising a selection of the following techniques, or all of them, to be performed by the receiver device:

comparison of the signature obtained from the navigation messages data stream received from a satellite at a given instant with the information that is common to all other satellites of the navigation system, wherein if the comparison result shows divergence between the satellite under analysis and the other satellites, a warning will be triggered and will be associated to the generated signature to prevent from using the information from the satellite or station;

comparison of the signature obtained from the navigation messages data stream received from a satellite at a given instant with the information that is common to all other satellites of the navigation system, wherein if the comparison result shows divergence between the satellite under analysis and the other satellites, a warning will be triggered and will be associated to the generated signature to prevent from using the information from the satellite or station;

comparison of the Doppler frequency deviation received from each satellite or navigation signals transmitting station with the prediction of the Doppler frequency deviation for the navigation receiver calculated in the receiver, wherein this prediction is calculated from the position, velocity and acceleration of the receiver and from the ephemeris of each satellite, wherein the calculation and comparison with the measurement of the Doppler deviation is done in the navigation receiver individually for each satellite for which a signal is received, wherein if the comparison result provides a divergent result, a warning will be associated with the generated signature to prevent from using the information from the satellite or station;

comparison of the signal level received from each satellite or navigation signals transmitting station with the prediction of the expected signal level for each satellite and calculated by using information on the position of the receiver, the spatial orientation of the receiver and the effect of this attitude on the receiving antenna pattern and the distance between the satellite or station and the receiver, wherein these data are obtained from the ephemeris of the satellites and the receiver position according to latitude, longitude, and height, wherein calculation of the level of the received signal from each satellite is made in the navigation receiver individually for each satellite for which a signal is received, wherein if the comparison result provides a divergent result, a warning will be associated with the generated signature to prevent from using the information from the satellite or station;

comparison of the information of the navigation messages for each satellite between two consecutive pages and verification of the updated information of the issue of data clock (IODC) and issue of data ephemeris (IODE) fields between these two consecutive pages, wherein if there are changes in the content of subframes between two consecutive pages and there is no update of the information of the issue of data, clock and issue of data ephemeris fields, a warning will be associated with the generated signature to prevent from using the information from the satellite or station;

comparison of the information of the navigation messages for each satellite between two consecutive subframes or pages and verification of the correct progression of the time counter in seconds of the week (TOW), wherein if the comparison shows an unexpected change, a warning will be associated with the generated signature to prevent from using the information from the satellite or station;

comparison of the information of the navigation messages among all satellites in view for the same page or subframe and verification of the correct progression of the time counter in seconds of the week; wherein if the comparison shows an unexpected change, a warning will be associated with the generated signature to prevent from using the information from the satellite or station;

comparison of the time of arrival of the preamble or synchronization header of each page or subframe for all satellites in sight and verification of the correct time distance between two consecutive preambles, wherein if this comparison shows an unexpected change, a warning will be associated with the generated signature to prevent from using the information from the satellite or station;

comparison of a signature calculated from the data received in the control center for a certain position of a receiver, the signature being integrated by a predetermined group of satellites or signal source stations, with the data received directly at the receiver from the satellites to verify the quality of the signals received, wherein the signature calculated in the control center will be sent to the receiving device that will use it as a reference pattern to estimate the quality of the signal received directly from the satellites;

verifying of the parity check of each word of each subframe of all satellites in view with respect to the content of the word, wherein if the verification shows an unexpected change, a warning will be associated with the generated signature to prevent from using the information from the satellite or station.

11. The method of claim 1 for encryption of the information stored and exchanged comprising the following steps:

encryption of information received and processed by the receiver device before being stored or transmitted towards the control center;

encryption of the information generated by the control center before being stored or transmitted towards the receiver devices or time reference stations;

wherein the encryption is done by symmetric or asymmetric keys.

12. The method of claim 1, further comprising using and applying the signature obtained for one or more of the following actions:

generating symmetric keys using the signatures synchronized in the receiver device and the control center as a source for generating encryption keys;

generating asymmetric keys using the signatures received in the receiver device and the control center, using a one-way secret function with an asymmetric encryption algorithm such as RSA;

key exchange between two or more points to be connected in a network;

acknowledging the identity of the parties connected by a link between two receivers and/or the control center;

generating padding bits for the data stream; and generating digital signatures to validate documents or actions.

* * * * *